United States Patent
Kasai et al.

(10) Patent No.: US 7,443,147 B2
(45) Date of Patent: Oct. 28, 2008

(54) DC-DC CONVERTER WITH STEP-UP AND STEP-DOWN CONTROL CAPABLE OF VARYING THE OFFSET VOLTAGE OF THE PWM TRIANGLE

(75) Inventors: Toshihiko Kasai, Kasugai (JP); Yoshihiro Kizaki, Kasugai (JP); Hidenobu Ito, Kasugai (JP)

(73) Assignee: Fujitsu Limited, Kawasaki (JP)

( * ) Notice: Subject to any disclaimer, the term of this patent is extended or adjusted under 35 U.S.C. 154(b) by 223 days.

(21) Appl. No.: 11/131,245

(22) Filed: May 18, 2005

(65) Prior Publication Data

US 2006/0198170 A1    Sep. 7, 2006

(30) Foreign Application Priority Data

Mar. 2, 2005    (JP) ............................... 2005-058129

(51) Int. Cl.
  *G05F 1/618*    (2006.01)
  *G05F 1/62*    (2006.01)
  *H03K 7/08*    (2006.01)

(52) U.S. Cl. ....................... 323/259; 323/284; 332/110

(58) Field of Classification Search ................. 323/259, 323/268, 225, 223, 260–263, 284, 222, 282, 323/288; 332/109–111
See application file for complete search history.

(56) References Cited

U.S. PATENT DOCUMENTS

| | | | | |
|---|---|---|---|---|
| 5,402,060 A | * | 3/1995 | Erisman | 323/268 |
| 5,914,591 A | * | 6/1999 | Yasuda et al. | 323/284 |
| 6,166,527 A | * | 12/2000 | Dwelley et al. | 323/222 |
| 6,275,016 B1 | * | 8/2001 | Ivanov | 323/224 |
| 6,580,253 B2 | * | 6/2003 | Kanakubo et al. | 323/222 |
| 6,788,033 B2 | * | 9/2004 | Vinciarelli | 323/225 |
| 2006/0208718 A1 | * | 9/2006 | Nitta et al. | 323/288 |
| 2006/0238182 A1 | * | 10/2006 | Yoshino | 323/282 |

FOREIGN PATENT DOCUMENTS

JP    10-225108 A    8/1998

OTHER PUBLICATIONS

Schoichi Nitta, Voltage Step-Up/Ste-Down DC-DC Converter, Nov. 18, 2004, Japanese Patent Office, JP 2004-328964 A, pp. 1-15.*

* cited by examiner

*Primary Examiner*—Jeffrey L. Sterrett
*Assistant Examiner*—Harry Behm
(74) *Attorney, Agent, or Firm*—Arent Fox LLP.

(57) ABSTRACT

When both step-up PWM control and step-down PWM controls are executed, the offset of the ON/OFF switching timing for step-up PWM control and/or the offset of ON/OFF switching timing for step-down PWM control are changed to become identical. By synchronizing ON/OFF switching timing for step-up PWM control and ON/OFF switching timing for step-down PWM control, the loss on switching can be reduced.

7 Claims, 13 Drawing Sheets

DC-DC CONVERTER WITH STEP-UP AND STEP-DOWN CONTROL CAPABLE OF VARYING THE OFFSET VOLTAGE OF THE PWM TRIANGLE

CROSS-REFERENCE TO RELATED APPLICATIONS

This Nonprovisional application claims priority under 35 U.S.C. §119(a) on Patent Application No. 2005-58129 filed in Japan on Mar. 2, 2005, the entire contents of which are hereby incorporated by reference.

BACKGROUND OF THE INVENTION

1. Field of the Invention

The present invention relates to a DC-DC converter for converting an input voltage into a predetermined output voltage by executing at least one of a plurality of kinds of PWM control, a DC-DC converter control apparatus for controlling such DC-DC converter, a power supply apparatus and an electronic equipment which convert voltage by such DC-DC converter or DC-DC converter control apparatus, and a control method for DC-DC converter by above mentioned method.

2. Description of Related Art

A portable electronic equipment such as a mobile phone or a notebook-sized personal computer uses battery as power source. However, since the output of battery undergoes a change such as output decrease due to electric discharge, a portable electronic equipment comprises a DC-DC converter for converting an output voltage of the battery into a voltage to be used in the equipment (see Japanese Patent Application Laid-Open No. 10-225108 (1998), for example). Known methods for converting voltage are of three kinds: a step-down method, a step-up method and a step-up/down method. In a step-down method, battery having an output voltage higher than the voltage to be used in the equipment is used and the output voltage is stepped down by a step-down DC-DC converter to the voltage to be used in the equipment. With this step-down method, though only voltage equal to or lower than the output voltage of the battery can be outputted, extremely high conversion efficiency such as 90% to 95% can be realized.

In a step-up method, battery having an output voltage lower than the voltage to be used in the equipment is used and the output voltage is stepped up by a step-up DC-DC converter to the voltage to be used in the equipment. With this step-up method, though voltage equal to or higher than the output voltage of the battery can be outputted, the conversion efficiency is not higher than 80% to 88%. A step-up/down method is used for a case where the output voltage of the battery rises above and falls below the voltage to be used in the equipment, wherein the output voltage of the battery is stepped up or stepped down by a step-up/down DC-DC converter to the voltage to be used in the equipment when the output voltage is lower or higher than the voltage to be used in the equipment.

FIG. 1 is a schematic circuit diagram showing an example of the configuration of a conventional flyback step-up/down DC-DC converter which uses a transformer. An input voltage terminal Vin is connected with an input terminal (drain) of an n-type field-effect transistor 1 (which will be hereinafter referred to as an FET 1) as a switching circuit, an input terminal of primary winding L1 of a transformer T is connected with an output terminal (source) of the FET 1, and an output terminal of the primary winding L1 is connected with an earthing terminal. Moreover, a control terminal (gate) of the FET 1 is connected with an output terminal DH1 of a control unit 2 and is turned ON/OFF by the control unit 2.

An input terminal of secondary winding L2 of the transformer T is connected with an earthing terminal and an input terminal (source) of an FET 4 as a synchronous rectification circuit is connected with an output terminal of the secondary winding L2. An output terminal (drain) of the FET 4 is connected with an output voltage terminal Vout of the DC-DC converter, and a control terminal (gate) of the FET 4 is connected with an output terminal DL1 of the control unit 2 and is turned ON/OFF by the control unit 2. Here, the output terminal DL1 outputs a signal *Q which is obtained by inverting an output signal Q of the output terminal DH1.

The output voltage terminal Vout of the DC-DC converter is connected with an earthing terminal via a smoothing capacitor C1 for smoothing and with an FB terminal of the control unit 2. The FB terminal of the control unit 2 is connected with an earthing terminal via a series circuit of a resistor R1 and a resistor R2. The node between the resistor R1 and the resistor R2 is connected with inverting input of an error amplifier ERA. Moreover, a reference voltage source e1 is connected with noninverting input of the error amplifier ERA. Output of the error amplifier ERA is connected with noninverting input of a comparator PWM for PWM control and an oscillator OSC for outputting triangular wave is connected with inverting input of the comparator PWM.

The control unit 2 compares a voltage, which is obtained by dividing the output voltage Vout of the DC-DC converter by the resistors R1 and R2, with a reference voltage e1 and outputs a voltage corresponding to the difference from the error amplifier ERA. The comparator PWM compares the output voltage of the error amplifier ERA with an output voltage of the oscillator OSC and outputs an ON signal when the output voltage of the error amplifier ERA is higher than the output voltage of the oscillator OSC. Accordingly, the pulse width of the output signal of the comparator PWM increases or decreases according to the output voltage of the error amplifier ERA.

The output Q of the comparator PWM is given to the FET 1 while the inverted output *Q is given to the FET 4. Accordingly, the FET 1 is turned on and the FET 4 is turned off when the comparator PWM outputs an ON signal. In contrast, the FET 1 is turned off and the FET 4 is turned on when the comparator PWM outputs an OFF signal (does not output an ON signal). When the FET is on, since an input voltage Vin is applied to the primary winding L1 of the transformer T, the electric current which flows through the primary winding L1 increases. Here, since the FET 4 is off, no electric current flows through the secondary winding L2 of the transformer T and energy is stored in the primary winding L1 of the transformer T. Then, when the FET 1 is turned off and the FET 4 is turned on, the energy stored in the primary winding L1 of the transformer T is discharged from the secondary winding L2 to the smoothing capacitor C1.

As described above, energy is stored in the primary winding L1 of the transformer T when the FET 1 is on (Ton) and the energy stored in the primary winding L1 is discharged from the secondary winding L2 when the FET 1 is off (Toff). Assuming that the winding ratio between the primary winding L1 and the secondary winding L2 is 1:1, the output voltage Vout is expressed by the following equation.

$$V\text{out} = (T\text{on}/T\text{off}) \times V\text{in}$$

Accordingly, by changing the ON/OFF ratio of the FET 1, the output voltage Vout can be larger, and also smaller, than the input voltage Vin. However, since the coil L1 for storing energy is different from the coil L2 for discharging the energy, there is a problem that the voltage conversion efficiency depends on, for example, the degree of coupling between the coils.

On the other hand, shown in FIG. 2 is a conventional step-up/down DC-DC converter which uses the same coil as a coil for storing energy and as a coil for discharging the energy. In FIG. 2, an FET 3 as a switching circuit and an FET 2 as a synchronous rectification circuit are added in order to replacing the transformer T with a choke coil L1 and to share the primary winding L1 and the secondary winding L2 of the transformer T. An input terminal (drain) of the FET 3 is connected with an output terminal of the choke coil L1 and an output terminal (source) of the FET 3 is connected with an earthing terminal. Being connected with the output terminal DH1 of the control unit 2, a control terminal (gate) of the FET 3 is turned ON/OFF by the control unit 2 simultaneously with the FET 1. Moreover, an input terminal (drain) of the FET 2 is connected with an input terminal of the choke coil L1 and an output terminal (source) of the FET 2 is connected with an earthing terminal. Being connected with the output terminal DL1 of the control unit 2, a control terminal (gate) of the FET 2 is turned ON/OFF by the control unit 2 simultaneously with the FET 4.

When the FET 1 and the FET 3 are turned on, the FET 4 and the FET 2 are off and the input terminal of the choke coil L1 provides an input voltage Vin, so that the input voltage Vin is applied to the choke coil L1 and the electric current which flows through the choke coil L1 increases. Then, when the FET 1 and the FET 3 are turned off and the FET 4 and the FET 2 are turned on, the output terminal of the choke coil L1 is connected with the output terminal Vout of the DC-DC converter, so that the energy stored in the choke coil L1 is discharged to the smoothing capacitor C1.

With the DC-DC converter shown in FIG. 2, since the same coil is used as a coil for storing energy and as a coil for discharging the energy, the efficiency of the DC-DC converter does not depends on, for example, the degree of coupling between the coils of the primary winding L1 and the secondary winding L2 of the transformer T shown in FIG. 1. With the DC-DC converter shown in FIG. 2, however, since a total of four switches—the FET 1 and the FET 3, and the FET 4 and the FET 2—are turned ON/OFF, that is, since twice as many switches as those of the DC-DC converter shown in FIG. 1 are turned ON/OFF simultaneously, the efficiency of switching drive is lowered.

Here, in the control unit 2 of the DC-DC converter shown in FIG. 2, the FET 1, the FET 2 and the choke coil L1 compose a step-down DC-DC converter. Moreover, the choke coil L1, the FET 3 and the FET 4 compose a step-up DC-DC converter. That is, the DC-DC converter shown in FIG. 2 is a step-up/down DC-DC converter composed of series-connected step-down DC-DC converter and step-up DC-DC converter sharing the choke coil L1, and can be rewritten as in the circuit diagram of FIG. 3.

In FIG. 3, a step-down comparator PWMD is a comparator for executing PWM control for step-down operations, and executes ON/OFF control of the FET 1 and the FET 2. Similarly, a step-up comparator PWMU is a comparator for executing PWM control for step-up operations, and executes ON/OFF control of the FET 3 and the FET 4. Moreover, an offset voltage source e2 is connected between inverting input of the step-up comparator PWMU and the oscillator OSC. Other configuration is the same as those of FIG. 2. One comparator PWM executes control in the DC-DC converter shown in FIG. 2 while a step-down comparator PWMD and a step-up comparator PWMU are provided separately in the DC-DC converter shown in FIG. 3 for relatively executing PWM control with separate duties.

The relation between the input voltage Vin and the output voltage Vout of the step-down DC-DC converter is represented by the following equations.

$Vout/Vin = Ton/(Ton+Toff)$ $Vout = Vin \times Ton/(Ton+Toff)$

Here, assuming that the on-duty of step-down PWM control is d1, the following equation is provided.

$Vout = Vin \times d1$

Moreover, the relation between the input voltage Vin and the output voltage Vout of the step-up DC-DC converter is represented by the following equations.

$Vout/Vin = (Ton+Toff)/Toff$ $Vout = Vin \times (Ton+Toff)/Toff$

Accordingly, assuming that the on-duty of step-up PWM control is d2, the following equation is provided.

$Vout = Vin \times 1/(1-d2)$

Accordingly, the relation between the input voltage Vin and the output voltage Vout of the step-up/down DC-DC converter composed of series-connected step-down DC-DC converter and step-up DC-DC converter is represented by the following equation.

$Vout = Vin \times d1/(1-d2)$

When the input voltage Vin is higher than the output voltage Vout and the step-up DC-DC converter is under suspension, the on-duty d2 of step-up PWM control is equal to zero and the above equation is rewritten as in the following equation.

$Vout = Vin \times d1$

Accordingly, in this case, step-down is achieved by step-down PWM control. Moreover, when the input voltage Vin is lower than the output voltage Vout and the step-down DC-DC converter has on-duty of 100%, the on-duty d1 of step-down PWM control is equal to 1 and the above equation is rewritten as in the following equation.

$Vout = Vin \times 1/(1-d2)$

Accordingly, in this case, step-up is achieved by step-up PWM control.

FIG. 4 is a timing chart schematically showing an example of the operational state of a case where step-up PWM control is not executed and step-down PWM control is executed. In FIG. 4, triangular wave inputted into the step-up comparator PWMU is shown in broken line and triangular wave inputted into the step-down comparator PWMD is shown in solid line. It should be noted that offset by the offset voltage source e2 arises at the triangular wave (broken line) inputted into the step-up comparator PWMU. Moreover, the output of the error amplifier ERA is included in the step-down operation area (amplitude area of triangular wave in solid line) but is not included in the step-up operation area (amplitude area of triangular wave in broken line). Regarding the step-down comparator PWMD, the FET 1 is turned on and the FET 2 is turned off when the triangular wave (solid line) is lower than the output of the error amplifier ERA, and the FET 1 is turned off and the FET 2 is turned on when the triangular wave (solid line) is higher than the output of the error amplifier ERA. On the other hand, regarding the step-up comparator PWMU, since the triangular wave (broken line) is higher than the output of the error amplifier ERA and the two never meets, the duty of step-up PWM control becomes 0%, the FET 3 remains off and the FET 4 remains on.

FIG. 5 is a timing chart schematically showing an example of the operational state of a case where step-down PWM control is not executed and step-up PWM control is executed. Each waveform in FIG. 5 is the same as that in FIG. 4. In FIG. 5, the output of the error amplifier ERA is included in the step-up operation area but is not included in the step-down operation area. Regarding the step-up comparator PWMU, the FET 3 is turned on and the FET 4 is turned off when the triangular wave (broken line) is lower than the output of the error amplifier ERA, and the FET 3 is turned off and the FET 4 is turned on when the triangular wave (broken line) is higher than the output of the error amplifier ERA. On the other hand, regarding the step-down comparator PWMD, since the triangular wave (solid line) is lower than the output of the error amplifier ERA and the two never meets, the duty of step-down PWM control becomes 100%, the FET 1 remains on and the FET 2 remains off.

FIG. 6 is a timing chart schematically showing the operational state of a case where both of step-up PWM control and step-down PWM control are executed. Each waveform in FIG. 6 is the same as that in FIG. 4 and FIG. 5. In FIG. 6, the output of the error amplifier ERA is included in both of the step-up operation area and the step-down operation area. Regarding the step-up comparator PWMU, the FET 3 is turned on and the FET 4 is turned off when the triangular wave (broken line) is lower than the output of the error amplifier ERA, and the FET 3 is turned off and the FET 4 is turned on when the triangular wave (broken line) is higher than the output of the error amplifier ERA. Moreover, regarding the step-down comparator PWMD, the FET 1 is turned on and the FET 2 is turned off when the triangular wave (solid line) is lower than the output of the error amplifier ERA, and the FET 1 is turned off and the FET 2 is turned on when the triangular wave (solid line) is higher than the output of the error amplifier ERA. Here, the ON/OFF switching timing for step-down PWM control and the ON/OFF switching timing for step-up PWM control are out of synchronization.

For executing only one of step-up PWM control and step-down PWM control, one pair of switches are turned ON/OFF. On the other hand, for executing both of step-up PWM control and step-down PWM control, two pairs of switches are turned ON/OFF, so that loss on ON/OFF switching of the switches is doubled. Moreover, when two pairs of switches are turned ON/OFF, since the switches are turned ON/OFF separately (asynchronously) for each pair, there is a problem that the loss is further increased. Here, the loss on ON/OFF operations of the switches is composed of drive loss of the switches; and resistance loss which arises in the transient area when the switches are switched from off to on or from on to off.

BRIEF SUMMARY OF THE INVENTION

The present invention has been made with the aim of solving the above problems, and it is an object thereof to provide a DC-DC converter, a DC-DC converter control apparatus and a control method for DC-DC converter capable of adjusting ON/OFF switching timing for PWM control optimally by changing ON/OFF switching timing for PWM control or offset of the switching timing on the basis of the kind of the PWM control under execution. Here, offset of switching timing is "deviation" from reference timing being arbitrarily set, and the switching timing is the same when the offset is the same.

Another object of the present invention is to provide a DC-DC converter and a DC-DC converter control apparatus capable of synchronizing ON/OFF switching timing for step-up PWM control and ON/OFF switching timing for step-down PWM control, reducing the number of ON/OFF switching times and reducing the loss on ON/OFF switching, by changing offset of ON/OFF switching timing for step-up PWM control and/or offset of ON/OFF switching timing for step-down PWM control so that the offset of ON/OFF switching timing for step-up PWM control and the offset of ON/OFF switching timing for step-down PWM control become identical when both of step-up PWM control and step-down PWM control are under execution.

Another object of the present invention is to provide a DC-DC converter capable of synchronizing the switching timing of a switching circuit for step-up PWM control and the switching timing of a switching circuit for step-down PWM control, reducing the number of switching times and reducing the loss on switching resistance, by configuring the converter to execute step-down PWM control for ON/OFF switching of a first switching circuit for step-down connected between one end of a choke coil and an input voltage terminal and for ON/OFF switching of a second switching circuit for step-down connected between one end of the choke coil and an earthing terminal and to execute step-up PWM control for ON/OFF switching of a third switching circuit for step-up connected between the other end of the choke coil and an earthing terminal and for ON/OFF switching of a fourth switching circuit for step-up connected between the other end of the choke coil and an output voltage terminal.

Another object of the present invention is to provide a DC-DC converter control apparatus capable of adjusting ON/OFF switching timing for step-up PWM control and/or step-down PWM control optimally by configuring the DC-DC converter control apparatus to change offset of ON/OFF switching timing for step-up PWM control and/or offset of ON/OFF switching timing for step-down PWM control on the basis of the kind of the PWM control under execution.

Another object of the present invention is to provide a DC-DC converter control apparatus capable of synchronizing ON/OFF switching timing of a PWM control signal, reducing the number of ON/OFF switching times and reducing the loss on switching, by configuring the DC-DC converter control apparatus to change offset of a step-up comparator circuit and/or offset of a step-down comparator circuit so that the offset of ON/OFF switching timing for a step-up PWM control signal and the offset of ON/OFF switching timing for a step-down PWM control signal become identical when both of step-up PWM control and step-down PWM control are under execution.

Another object of the present invention is to provide a power supply apparatus and an electronic equipment capable of synchronizing ON/OFF switching timing for PWM control, reducing the number of ON/OFF switching times, reducing the loss on switching and improving the conversion efficiency, by comprising the DC-DC converter mentioned above or the DC-DC converter control apparatus mentioned above.

A DC-DC converter according to the first aspect of the present invention is a DC-DC converter for converting an input voltage into a predetermined output voltage by executing at least one of a plurality of kinds of PWM control, characterized by comprising an offset change circuit for changing offset of ON/OFF switching timing for PWM control on the basis of a kind of PWM control under execution.

A DC-DC converter according to the second aspect of the present invention is that of the first aspect, characterized in that the plurality of kinds of PWM control includes step-up PWM control, step-down PWM control, and both of step-up PWM control and step-down PWM control, and the offset change circuit, when kinds of PWM control under execution are both of step-up PWM control and step-down PWM control, changes offset of ON/OFF switching timing for step-up PWM control and/or offset of ON/OFF switching timing for step-down PWM control so that the offset of ON/OFF switching timing for step-up PWM control and the offset of ON/OFF switching timing for step-down PWM control become identical.

A DC-DC converter according to the third aspect of the present invention is that of the second aspect, characterized by further comprising: a choke coil: a first switching circuit for step-down connected between one end of the choke coil and an input voltage terminal; a second switching circuit for step-down connected between one end of the choke coil and an earthing terminal; a third switching circuit for step-up connected between the other end of the choke coil and an earthing terminal; and a fourth switching circuit for step-up connected between the other end of the choke coil and an output voltage terminal; wherein ON/OFF switching of the first switching circuit and ON/OFF switching of the second switching circuit are controlled for step-down PWM control, and ON/OFF switching of the third switching circuit and ON/OFF switching of the fourth switching circuit are controlled for step-up PWM control.

A DC-DC converter control apparatus according to the fourth aspect of the present invention is a DC-DC converter control apparatus for controlling a DC-DC converter to convert an input voltage into a predetermined output voltage by making the DC-DC converter execute at least one of a plurality of kinds of PWM control, characterized by comprising an offset change circuit for changing offset of ON/OFF switching timing for PWM control on the basis of a kind of PWM control under execution by the DC-DC converter.

A DC-DC converter control apparatus according to the fifth aspect of the present invention is that of the fourth aspect, characterized in that the plurality of kinds of PWM control includes step-up PWM control, step-down PWM control, and both of step-up PWM control and step-down PWM control, and the offset change circuit changes offset of ON/OFF switching timing for step-up PWM control and/or offset of ON/OFF switching timing for step-down PWM control on the basis of a kind of PWM control under execution by the DC-DC converter.

A DC-DC converter control apparatus according to the sixth aspect of the present invention is that of the fifth aspect, characterized in that the offset change circuit, when kinds of PWM control under execution by the DC-DC converter are both of step-up PWM control and step-down PWM control, changes offset of ON/OFF switching timing for step-up PWM control and/or offset of ON/OFF switching timing for step-down PWM control so that the offset of ON/OFF switching timing for step-up PWM control and the offset of ON/OFF switching timing for step-down PWM control become identical.

A DC-DC converter control apparatus according to the seventh aspect of the present invention is that of the fifth aspect, characterized by further comprising: a differential output circuit for outputting a signal corresponding to a difference between an output voltage and a predetermined voltage; an oscillator for outputting a triangular wave signal; a step-up comparator circuit for comparing signals outputted from the oscillator and the differential output circuit and outputting a step-up PWM control signal corresponding to a comparison result; and a step-down comparator circuit for comparing signals outputted from the oscillator and the differential output circuit and outputting a step-down PWM control signal corresponding to a comparison result; wherein the offset change circuit, when kinds of PWM control under execution by the DC-DC converter are both of step-up PWM control and step-down PWM control, changes circuit for changing offset for the step-up comparator circuit and/or offset for the step-down comparator circuit so that offset of ON/OFF switching timing for the step-up PWM control signal and offset of ON/OFF switching timing for the step-down PWM control signal become identical.

A power supply apparatus according to the eighth aspect of the present invention is characterized by including a DC-DC converter or a DC-DC converter control apparatus of any one of the first through seventh aspects, wherein the DC-DC converter or the DC-DC converter control apparatus executes voltage conversion.

An electronic equipment according to the ninth aspect of the present invention is characterized by including a DC-DC converter or a DC-DC converter control apparatus of any one of the first through seventh aspects, wherein the DC-DC converter or the DC-DC converter control apparatus executes voltage conversion.

A control method for DC-DC converter according to the tenth aspect of the present invention is a control method for DC-DC converter for controlling a DC-DC converter to convert an input voltage into a predetermined output voltage by making the DC-DC converter execute at least one of a plurality of kinds of PWM control, characterized by comprising steps of identifying a kind of PWM control under execution by the DC-DC converter; and changing offset of ON/OFF switching timing for PWM control on the basis of the identified kind of PWM control.

In the first, fourth and tenth aspects of the present invention, since ON/OFF switching timing for PWM or offset of the switching timing is changed on the basis of the kind of the PWM control under execution, the ON/OFF switching timing for PWM control can be adjusted optimally according to the PWM control under execution. For example, by synchronizing the ON/OFF switching timing for PWM control, the number of ON/OFF switching times can be reduced and the loss on ON/OFF switching can be reduced.

In the second and sixth aspects of the present invention, when both of step-up PWM control and step-down PWM control are under execution, offset of ON/OFF switching timing for step-up PWM control and/or offset of ON/OFF switching timing for step-down PWM control is changed so that the offset of ON/OFF switching timing for step-up PWM control and the offset of ON/OFF switching timing for step-down PWM control become identical. Accordingly, it is possible to uniform the ON/OFF switching timing for step-up PWM control and the ON/OFF switching timing for step-down PWM control. It should be noted that to uniform (synchronize) ON/OFF switching timing includes to uniform switching timing from on to off and switching timing from off to on. By synchronizing ON/OFF switching timing for each PWM control for step-down and step-up, the number of ON/OFF switching times can be reduced, the loss on ON/OFF switching can be reduced and the conversion efficiency can be improved.

In the third aspect of the present invention, the converter is configured to execute step-down PWM control for ON/OFF switching of a first switching circuit for step-down connected between one end of a choke coil and an input voltage terminal and for ON/OFF switching of a second switching circuit for step-down connected between one end of the choke coil and an earthing terminal and to execute step-up PWM control for ON/OFF switching of a third switching circuit for step-up connected between the other end of the choke coil and an earthing terminal and for ON/OFF switching of a fourth switching circuit for step-up connected between the other end of the choke coil and an output voltage terminal. Accordingly, by changing offset of ON/OFF switching timing for PWM control as mentioned above, it is possible to uniform the switching timing of a switching circuit for step-up PWM control and the switching timing of a switching circuit for step-down PWM control. By synchronizing switching timing of a switching circuit, the number of ON/OFF switching times can be reduced, the loss on switching resistance can be reduced and the conversion efficiency can be improved.

In the fifth aspect of the present invention, since step-up PWM control, step-down PWM control or both of step-up PWM control and step-down PWM control are executed and offset of ON/OFF switching timing for step-up PWM control and/or offset of ON/OFF switching timing for step-down PWM control is changed on the basis of the kind of the PWM control under execution, ON/OFF switching timing for step-up PWM control and/or step-down PWM control can be adjusted optimally according to the PWM control under execution. For example, by synchronizing ON/OFF switching timing for step-up PWM control and ON/OFF switching timing for step-down PWM control, the number of ON/OFF switching times can be reduced, the loss on switching can be reduced and the conversion efficiency can be improved.

In the seventh aspect of the present invention, the apparatus is configured to change offset for a step-up comparator circuit and/or offset for a step-down comparator circuit so that the offset of ON/OFF switching timing for a step-up PWM control signal and the offset of ON/OFF switching timing for a step-down PWM control signal become identical when both of step-up PWM control and step-down PWM control are under execution. Accordingly, it is possible to uniform ON/OFF switching timing of a step-up PWM control signal and ON/OFF switching timing of a step-down PWM control signal. By synchronizing ON/OFF switching timing of both of the PWM control signals, the number of ON/OFF switching times can be reduced, the loss on switching can be reduced and the conversion efficiency can be improved.

In the eighth aspect of the present invention, which comprises a DC-DC converter mentioned above or a DC-DC converter control apparatus mentioned above, by synchronizing ON/OFF switching timing for step-down PWM control and ON/OFF switching timing for step-up PWM control, the number of ON/OFF switching times can be reduced, the loss on switching can be reduced and the conversion efficiency can be improved.

With the first, fourth, eighth, ninth and tenth aspects of the present invention, ON/OFF switching timing for PWM control can be adjusted optimally.

With the second, sixth, eighth and ninth aspects of the present invention, by synchronizing ON/OFF switching timing for step-up PWM control and ON/OFF switching timing for step-down PWM control, the number of ON/OFF switching times can be reduced, the loss on ON/OFF switching can be reduced and the conversion efficiency can be improved.

With the third, eighth and ninth aspects of the present invention, by synchronizing the switching timing of the first and second switching circuits for step-down PWM control and the switching timing of the third and fourth switching circuits for step-up PWM control, the number of switching times can be reduced, the loss on switching resistance can be reduced and the conversion efficiency can be improved.

With the fifth, eighth and ninth aspects of the present invention, ON/OFF switching timing for step-up PWM control and/or step-down PWM control can be adjusted optimally.

With the seventh, eighth and ninth aspects of the present invention, by synchronizing ON/OFF switching timing of a step-down PWM control signal and a step-up PWM control signal, the number of ON/OFF switching times can be reduced, the loss on switching can be reduced and the conversion efficiency can be improved.

The above and further objects and features of the invention will more fully be apparent from the following detailed description with accompanying drawings.

DETAILED DESCRIPTION OF THE PREFERRED EMBODIMENTS

The following description will explain the present invention in the concrete with reference to the drawings illustrating some embodiments thereof.

Figure 7:
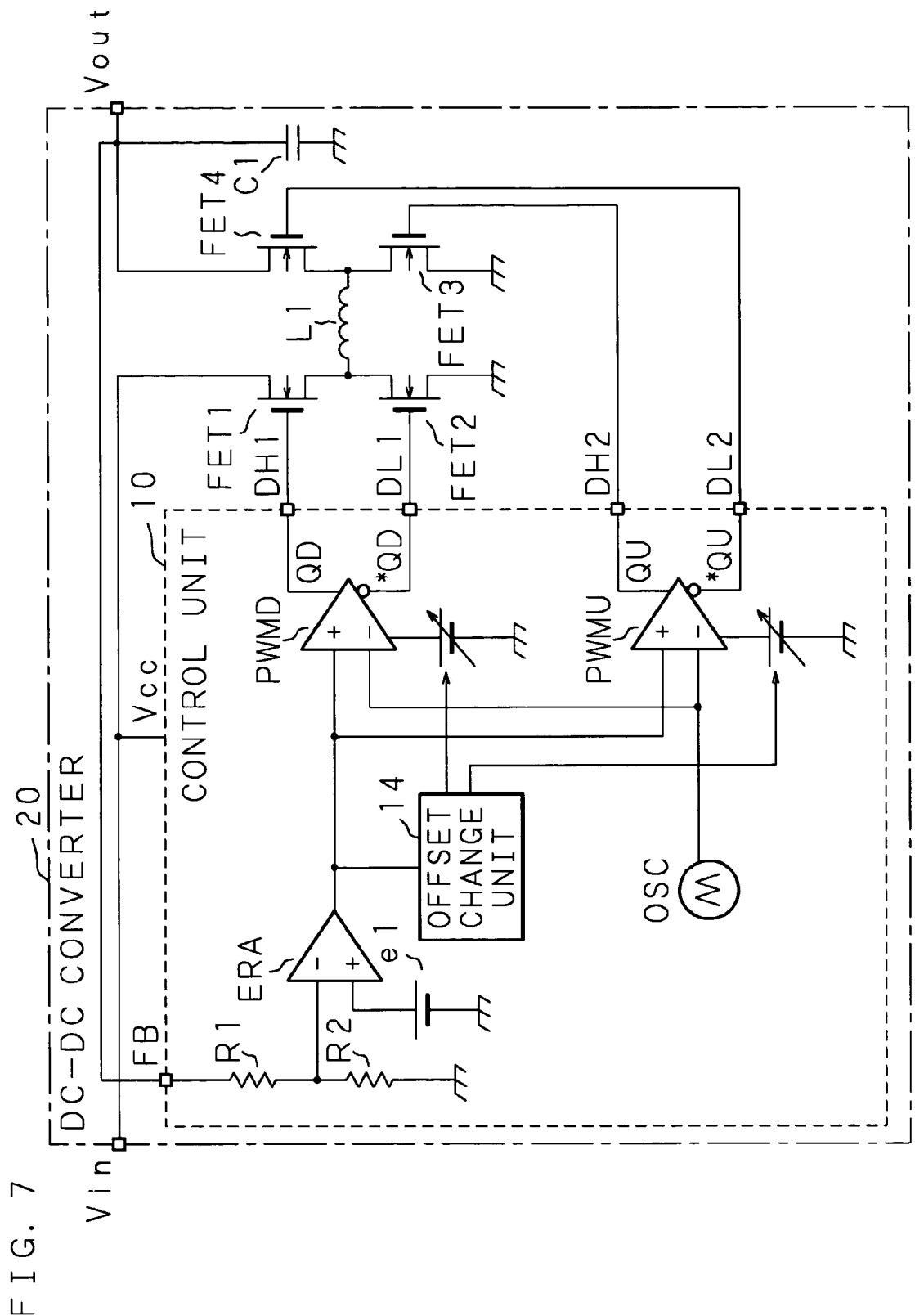
FIG. 7 is a schematic circuit diagram showing an example of a DC-DC converter which uses a DC-DC converter control apparatus according to the present invention.
Figure 8:
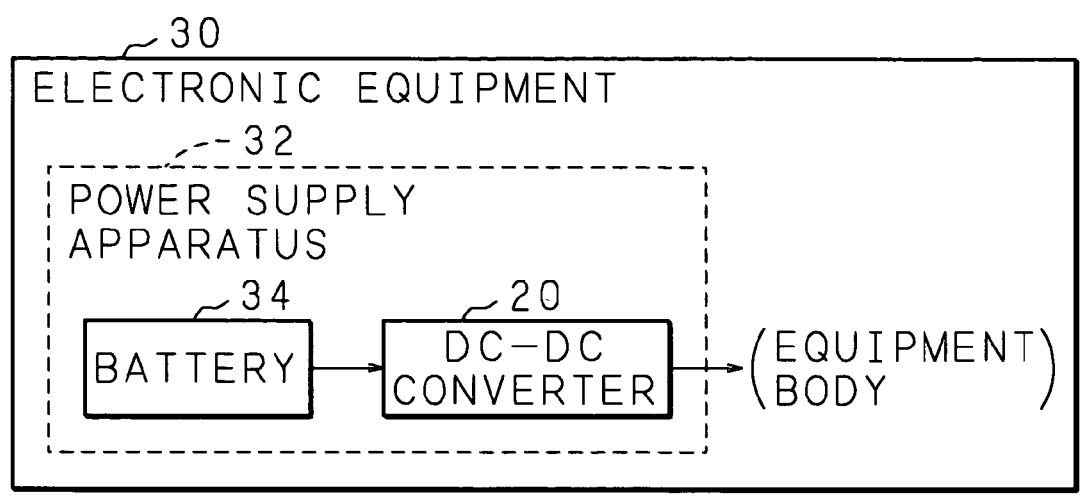
FIG. 8 is a block diagram showing an example of an electronic equipment which uses a power supply apparatus provided with the DC-DC converter shown in FIG. 7.

FIG. 7 is a schematic circuit diagram showing an example of a DC-DC converter which uses a DC-DC converter control apparatus (control unit) according to the present invention. FIG. 8 is a block diagram showing an example of an electronic equipment 30, such as a mobile phone or a notebook-sized personal computer, which uses a power supply apparatus provided with the DC-DC converter according to the present invention shown in FIG. 7.

The DC-DC converter 20 shown in FIG. 7 converts a voltage inputted into an input voltage terminal Vin into a predetermined voltage and outputs the voltage from an output voltage terminal Vout. The DC-DC converter 20 comprises: a choke coil L1; n-type field-effect transistors FET 1 (first switching circuit), FET 2 (second switching circuit), FET 3 (third switching circuit) and FET 4 (fourth switching circuit) connected with the choke coil L1, respectively; a smoothing capacitor C1; and a control unit (DC-DC converter control apparatus) 10 for controlling ON/OFF switching of the field-effect transistors FET 1 to FET 4 (which will be hereinafter referred to as FET 1 to FET 4). Moreover, the power supply apparatus 32 shown in FIG. 8 comprises a battery 34 and the DC-DC converter 20, and converts an output voltage of the battery 34 with the DC-DC converter 20 into a predetermined voltage and supplies the voltage to the equipment body.

In the DC-DC converter 20, an input voltage terminal Vin is connected with an input terminal (drain) of the FET 1 as a switching circuit, an input terminal of the choke coil L1 is connected with an output terminal (source) of the FET 1 and an output terminal DH1 of the control unit 10 is connected with a control terminal (gate) of the FET 1. The FET 1 is thus turned ON/OFF by the control unit 10. Moreover, an input terminal (drain) of the FET 2 as a synchronous rectification circuit is connected with the input terminal of the choke coil L1, an output terminal (source) of the FET 2 is connected with an earthing terminal and an output terminal DL1 of the control unit 10 is connected with a control terminal (gate) of the FET 2. The FET 2 is thus turned ON/OFF by the control unit 10. It should be noted that the output terminal DL1 outputs a signal *QD which is obtained by inverting an output signal QD (step-down PWM control signal) of the output terminal DH1.

Moreover, an input terminal (source) of the FET 3 as a switching circuit is connected with an earthing terminal, an output terminal of the choke coil L1 is connected with an output terminal (drain) of the FET 3 and an output terminal DH2 of the control unit 10 is connected with a control terminal (gate) of the FET 3. The FET 3 is thus turned ON/OFF by the control unit 10. Moreover, an input terminal (source) of the FET 4 as a synchronous rectification circuit is connected with the output terminal of the choke coil L1, an output terminal (drain) of the FET 4 is connected with an output voltage terminal Vout and a control terminal (gate) of the FET 4 is connected with an output terminal DL2 of the control unit 10. The FET 4 is thus turned ON/OFF by the control unit 10. It should be noted that the output terminal DL2 outputs a signal *QU which is obtained by inverting an output signal QU (step-up PWM control signal) of the output terminal DH2.

The output voltage terminal Vout of the DC-DC converter 20 is connected with an earthing terminal via the smoothing capacitor C1 and with an FB terminal of the control unit 10. The FB terminal of the control unit 10 is connected with an earthing terminal via a series circuit of a resistor R1 and a resistor R2. The node between the resistor R1 and the resistor R2 is connected with inverting input of an error amplifier (differential output circuit) ERA. Moreover, a reference voltage source e1 is connected with noninverting input of the error amplifier ERA. Output of the error amplifier ERA is connected with noninverting input of a step-down comparator PWMD (step-down comparator circuit) for executing step-down PWM control and with noninverting input of a step-up comparator PWMU (step-up comparator circuit) for executing step-up PWM control. Moreover, an oscillator OSC for outputting triangular wave is connected with inverting input of the step-down comparator PWMD and inverting input of the step-up comparator PWMU.

Moreover, the output terminal of the error amplifier ERA is connected with an offset change unit 14 (change circuit) for changing offset of ON/OFF switching timing of step-down PWM control and step-up PWM control under execution by the step-down comparator PWMD and the step-up comparator PWMU. The offset change unit 14 changes offset of each ON/OFF switching timing for step-down PWM control and step-up PWM control so that offset of ON/OFF switching timing for step-down PWM control and offset of ON/OFF switching timing for step-up PWM control become identical when the output voltage of the error amplifier ERA is within a step-up control area and a step-down control area and both of step-down PWM control and step-up PWM control are executed. In particular, the offset change unit 14 judges whether the output voltage of the error amplifier ERA is within both of the step-up control area and the step-down control area or not, and changes offset of ON/OFF switching timing of the step-down comparator PWMD and the step-up comparator PWMU so as to become identical when the output voltage is within both of the step-up control area and the step-down control area. It should be noted that to make offset of ON/OFF switching timing identical includes to make offset of switching from on to off and offset of switching from off to on identical. Offset of ON/OFF switching timing can be changed by generating offset at triangular wave inputted from the oscillator OSC, for example, (see e2 of FIG. 10) and changing the generated offset.

Figure 9:
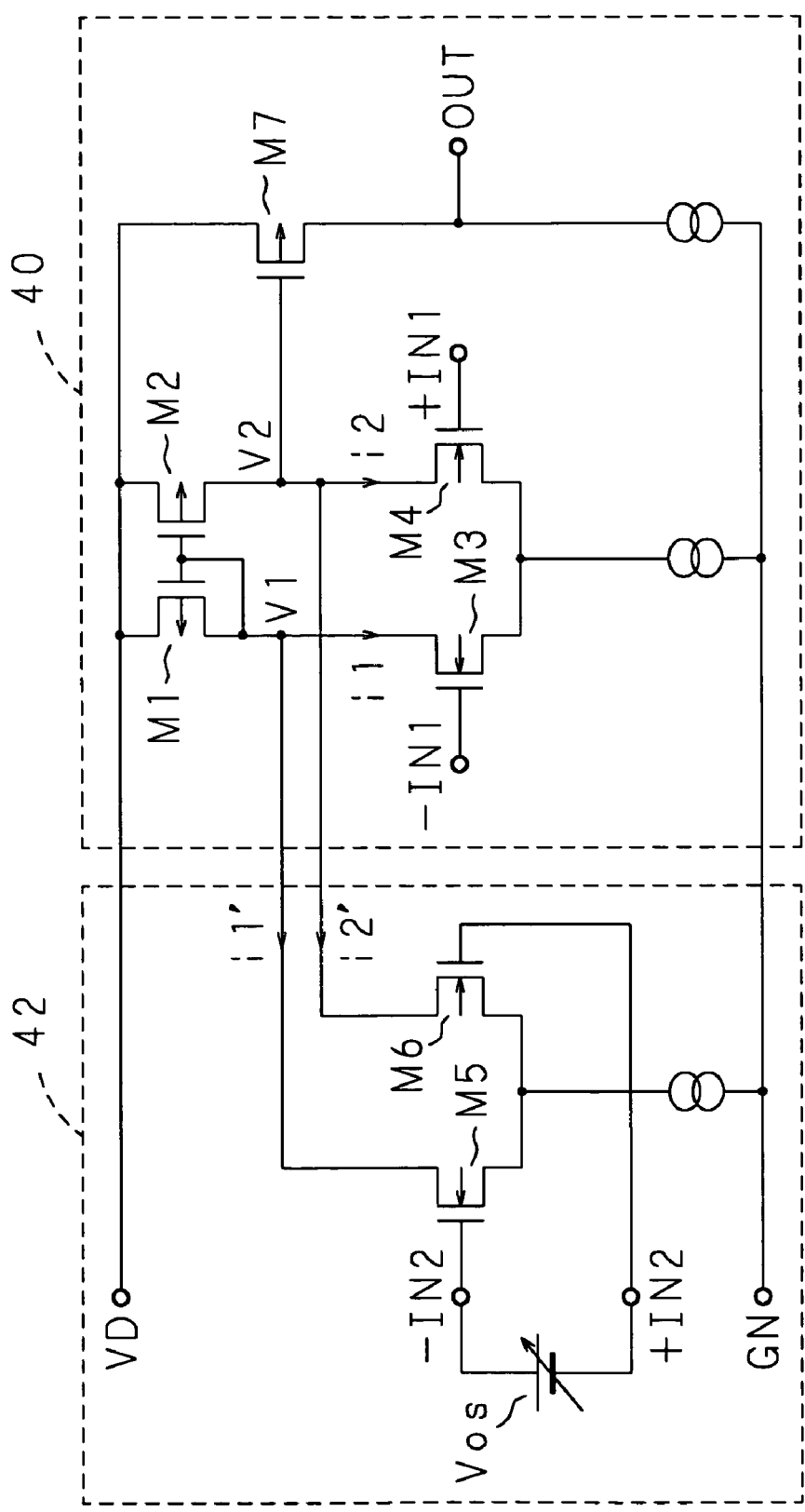
FIG. 9 is a circuit diagram showing an example of the configuration for generating offset of ON/OFF switching timing.

FIG. 9 is a circuit diagram showing an example of the configuration for generating offset of ON/OFF switching timing, in which an offset generating circuit 42 is connected with a differential amplifier 40 which operates as a comparator. In the differential amplifier 40, p-type transistors M1 and M2 are connected with a voltage VD terminal, an n-type transistor M3 is series-connected with the transistor M1, an n-type transistor M4 is series-connected with the transistor M2 and the transistors M3 and M4 are connected with an earthing terminal via a common current source. Moreover, a p-type transistor M7 is connected with the voltage VD terminal. The transistor M7 is connected with an earthing terminal via a current source. A control terminal of the transistor M7 is connected between the transistor M2 and the transistor M4. Moreover, control terminals of the transistors M1 and M2 are connected between the transistor M1 and the transistor M3.

In the offset generating circuit 42, an n-type transistor M5 is connected between a current source connected with an earthing terminal and the node between the transistor M1 and the transistor M3. Moreover, an n-type transistor M6 is connected between the current source mentioned above and the node between the transistor M2 and the transistor M4. Moreover, a positive pole of a variable voltage source Vos is connected with a control terminal of the transistor M5 and a negative pole of the variable voltage source Vos is connected with a control terminal of the transistor M6.

The sum of current i1 which flows from the transistor M1 to the transistor M3 and current i1' which flows from the transistor M1 to the transistor M5 is equal to the sum of current i2 which flows from the transistor M2 to the transistor M4 and current i2' which flows from the transistor M2 to the transistor M6 (i1+i1'=i2+i2'). When the output of the variable voltage source Vos is zero, since i1' is equal to i2' (i1=i2'), i1 is equal to i2 (i1=i2). Accordingly, from an OUT terminal between the transistor M7 and the current source, an output voltage such that offset does not generate between a control terminal (−IN1) of the transistor M3 and a control terminal (+IN1) of the transistor M4 is outputted. On the other hand, when the output of the variable voltage source Vos is not zero, since i1' is not equal to i2' (i1'≠i2'), i1 is not equal to i2 (i1≠i2). Accordingly, from the OUT terminal, an output voltage such that offset generates between the control terminal (−IN1) of the transistor M3 and a control terminal (+IN1) of the transistor M4 is outputted. Moreover, the value of offset can be adjusted by the output of the variable voltage source Vos.

The control unit 10 compares a voltage which is obtained by dividing the output voltage Vout of the DC-DC converter by the resistors R1 and R2 with the reference voltage e1 and outputs a voltage corresponding to the difference from the error amplifier ERA. Moreover, the offset change unit 14 makes an adjustment so that offset of triangular wave inputted into the step-down comparator PWMD and offset of triangular wave inputted into the step-up comparator PWMU become identical when the output voltage of the error amplifier ERA is included in both of the step-up control area and the step-down control area. The step-down comparator PWMD and the step-up comparator PWMU compare the output voltage of the error amplifier ERA with the output voltage of the oscillator OSC, and output an ON signal when the output voltage of the error amplifier ERA is higher than the output voltage of the oscillator OSC. Accordingly, the duty and ON/OFF switching timing of output signals (QU and *QU, and QD and *QD) of the step-down comparator PWMD and the step-up comparator PWMU are adjusted according to the output voltage of the error amplifier ERA and offset of triangular wave.

Figure 10:
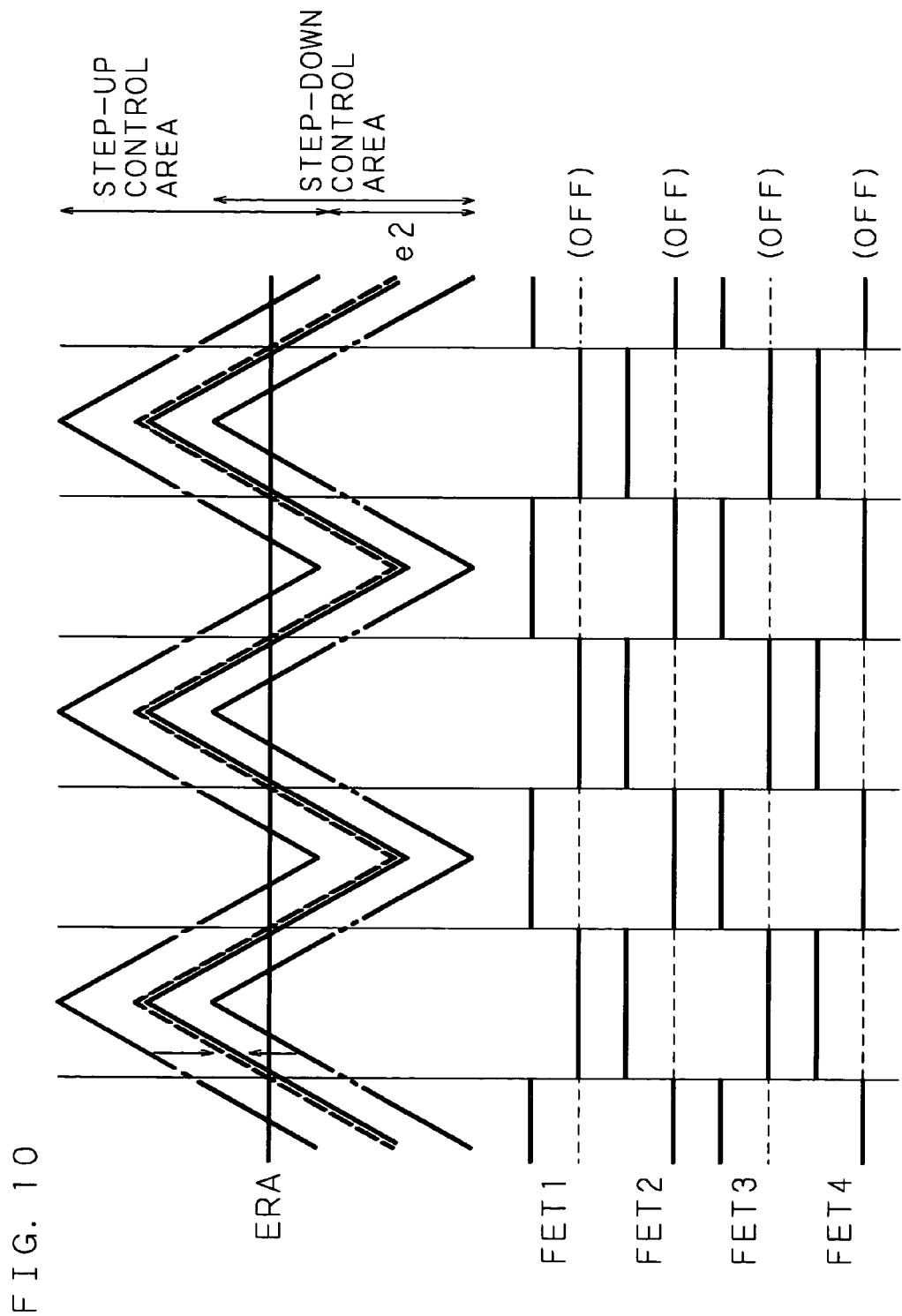
FIG. 10 is a timing chart schematically showing an example of the operational state of a case where both of step-up PWM control and step-down PWM control are executed.

FIG. 10 is a timing chart schematically showing an example of the operational state of a case where both of step-up PWM control and step-down PWM control are executed. In FIG. 10, triangular wave which is inputted into the step-up comparator PWMU before offset change is shown in long dashed short dashed line and triangular wave which is inputted into the step-down PWMD before offset change is shown in long dashed double-short dashed line. In FIG. 10, the output of the error amplifier ERA is included in both of the step-up operation area (amplitude area of triangular wave in long dashed short dashed line) and the step-down operation area (amplitude area of triangular wave in long dashed double-short dashed line). Accordingly, the offset change unit 14 changes the output of the variable voltage source Vos of each offset generating circuit 42 of the step-up comparator PWMU and the step-down comparator PWMD so that offset of triangular wave (long dashed short dashed line) inputted into the step-up comparator PWMU and offset of triangular wave (long dashed double-short dashed line) inputted into the step-down comparator PWMD become identical. In particular, offset of triangular wave (long dashed short dashed line) inputted into the step-up comparator PWMU is lowered as the triangular wave shown in broken line and offset of triangular wave (long dashed double-short dashed line) inputted into the step-down comparator PWMD is heightened as the triangular wave shown in solid line. Each amount of offset change can be, for example, half (e2/2) of offset e2 generated at both triangular waves (long dashed short dashed line and long dashed double-short dashed line).

Figure 1:
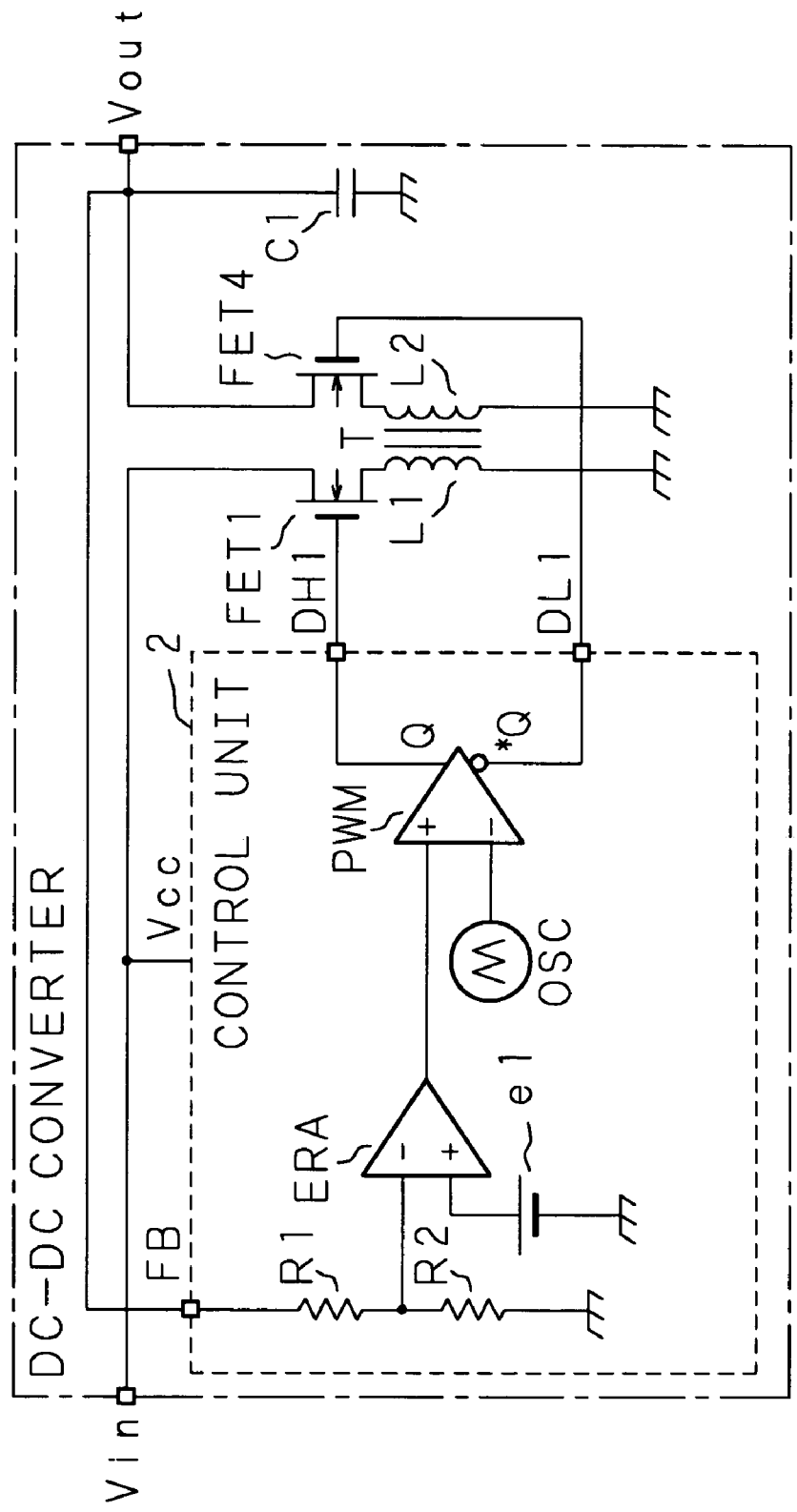
FIG. 1 is a schematic circuit diagram showing an example of the configuration of a conventional flyback step-up/down DC-DC converter which uses a transformer.
Figure 2:
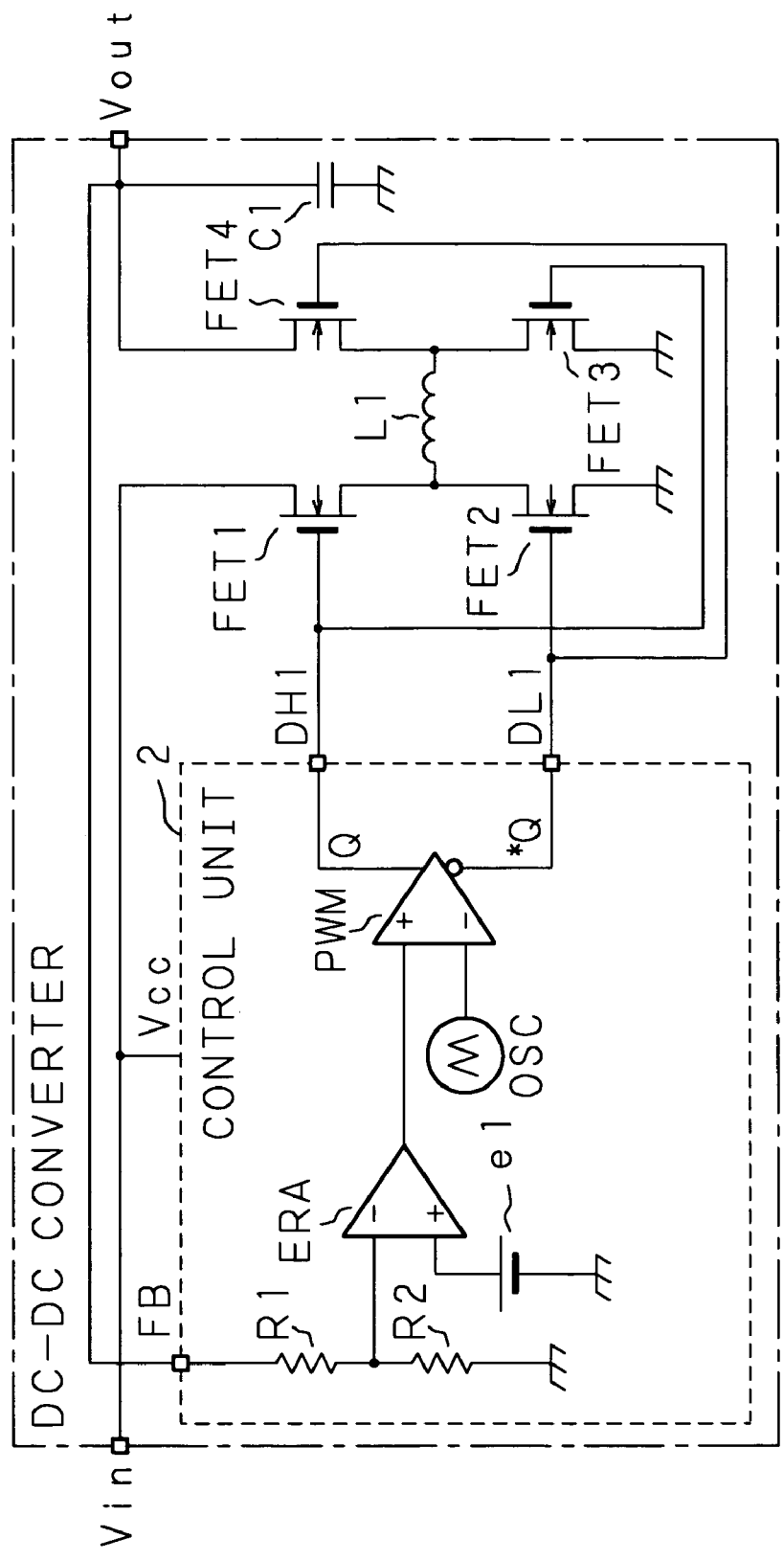
FIG. 2 is a schematic circuit diagram showing an example of the configuration of a conventional step-up/down DC-DC converter which uses the same coil as a coil for storing energy and as a coil for discharging the energy.
Figure 3:
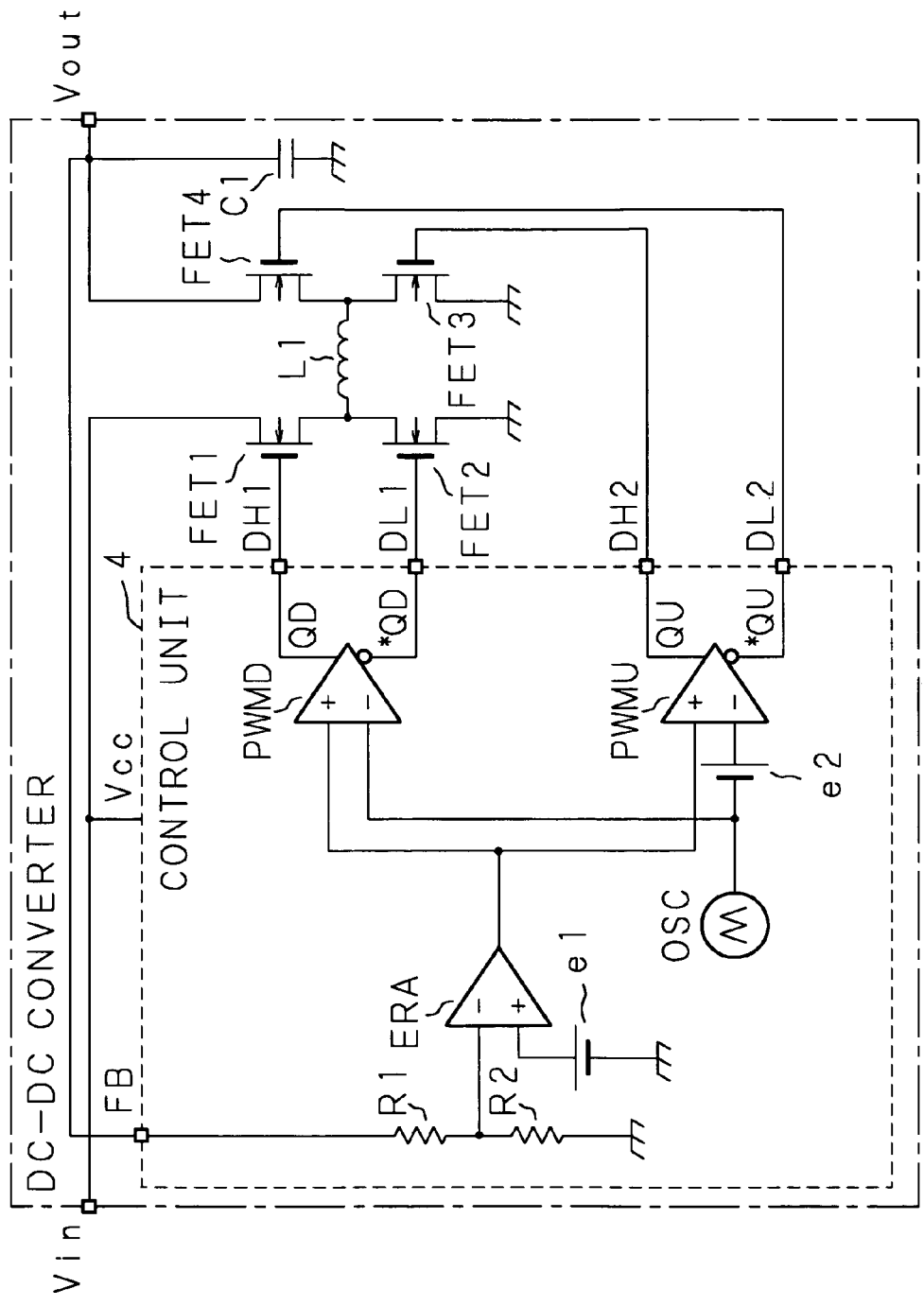
FIG. 3 is a schematic circuit diagram showing an example of the configuration of a conventional step-up/down DC-DC converter composed of series-connected step-down DC-DC converter and step-up DC-DC converter sharing a choke coil.
Figure 4:
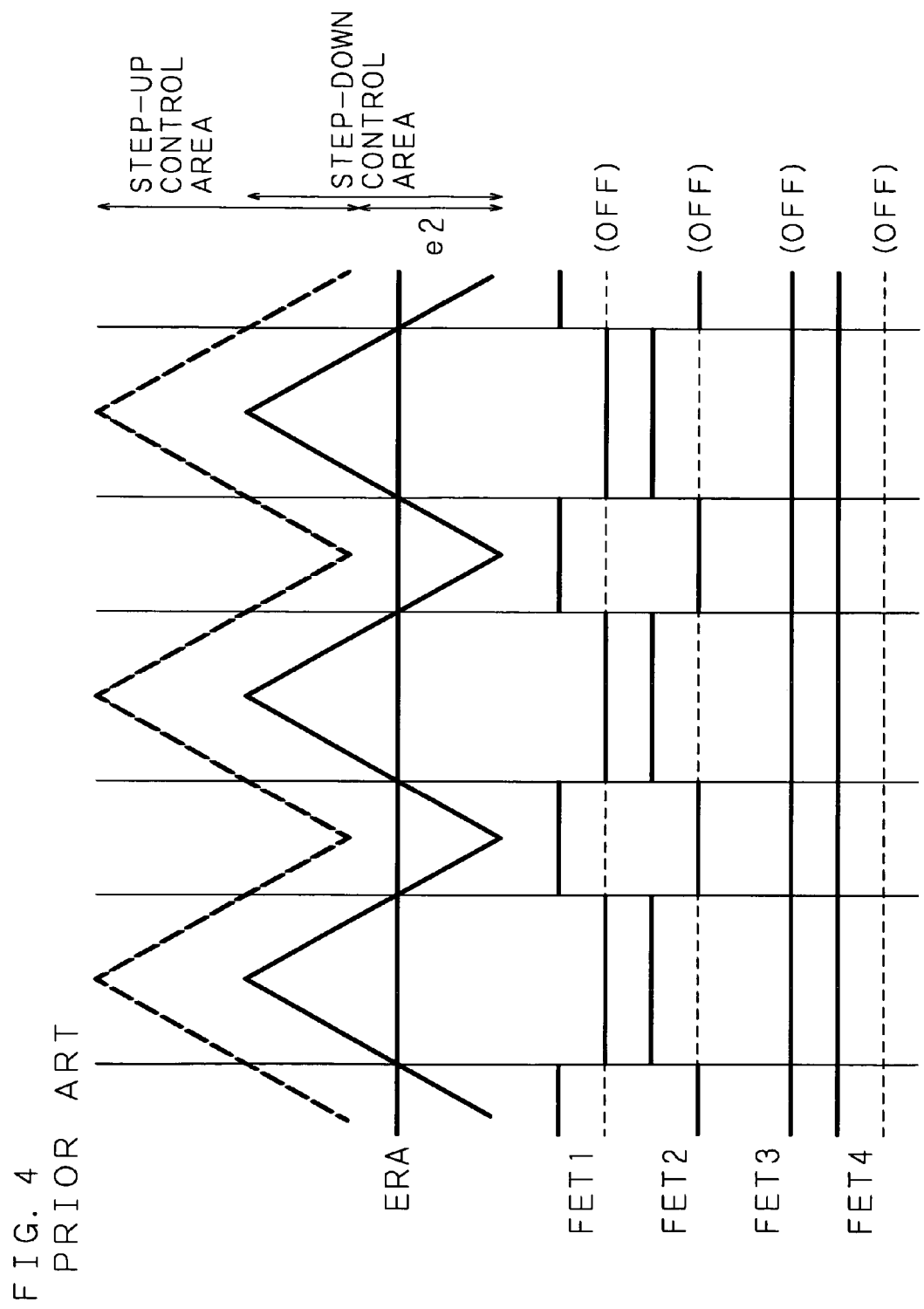
FIG. 4 is a timing chart schematically showing an example of the conventional operational state of a case where step-up PWM control is not executed and step-down PWM control is executed.
Figure 5:
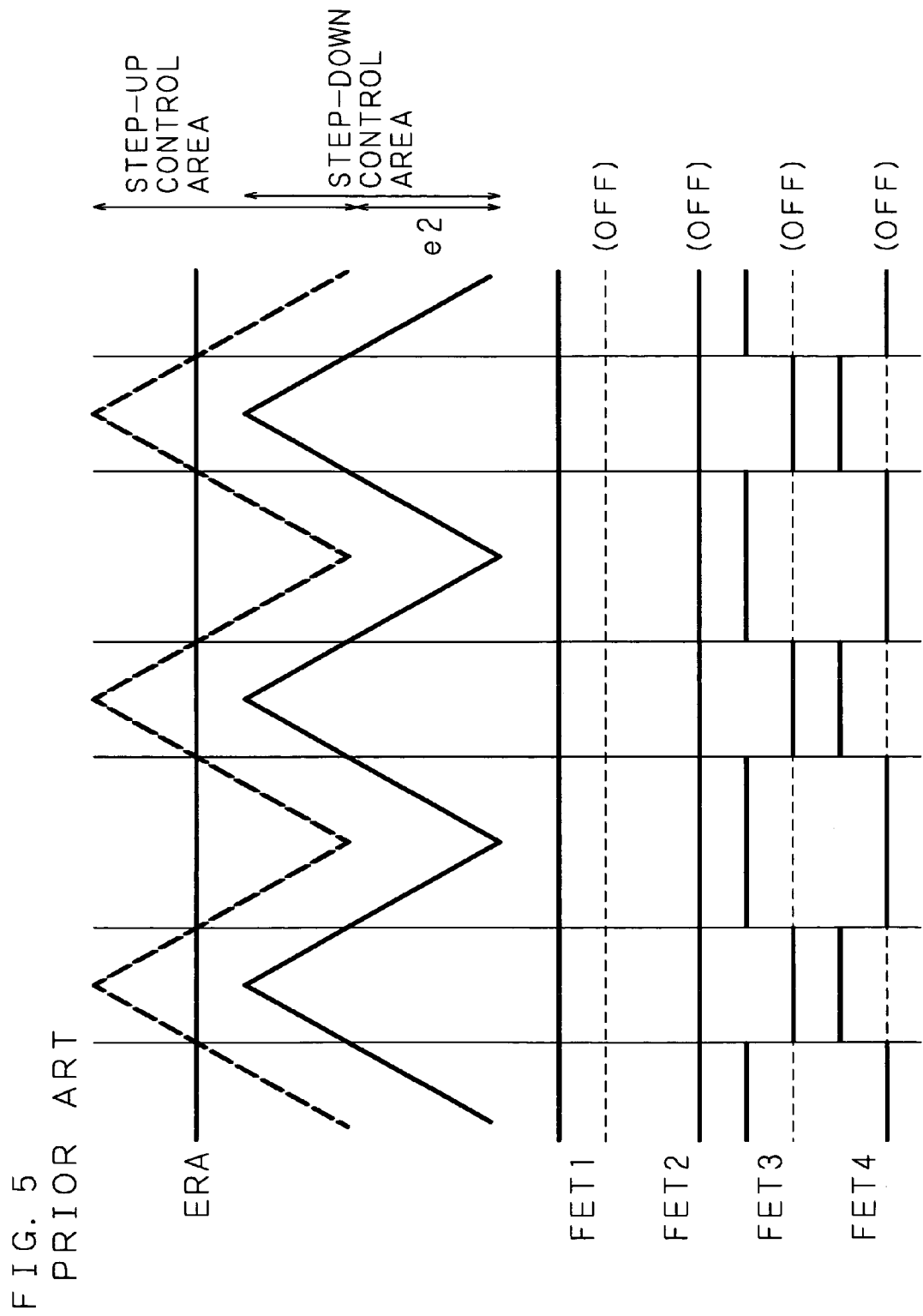
FIG. 5 is a timing chart schematically showing an example of the conventional operational state of a case where step-down PWM control is not executed and step-up PWM control is executed.
Figure 6:
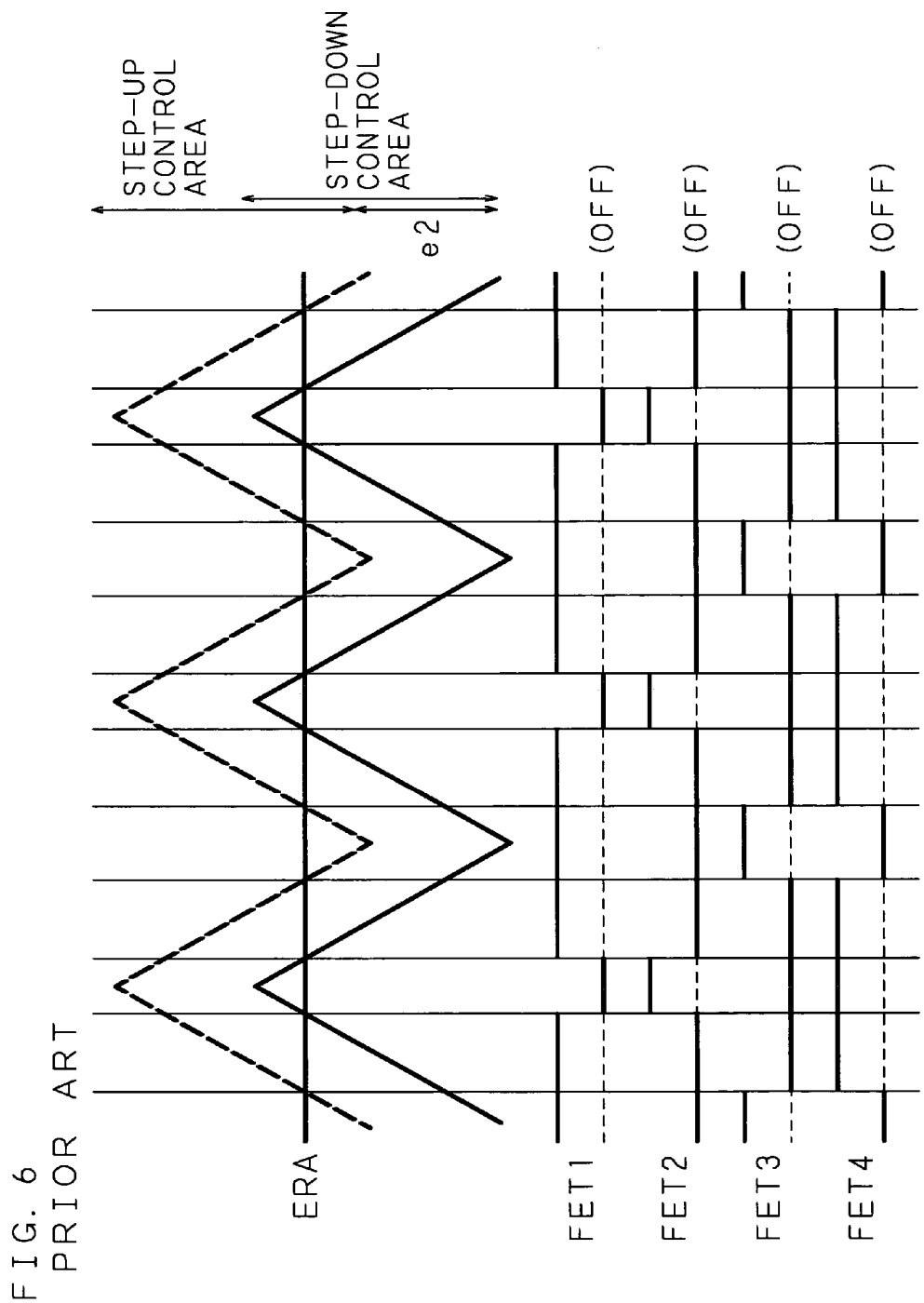
FIG. 6 is a timing chart schematically showing an example of the conventional operational state of a case where both of step-up PWM control and step-down PWM control are executed.

Regarding the step-up comparator PWMU, the FET 3 is turned on and the FET 4 is turned off when triangular wave (broken line) is lower than the output of the error amplifier ERA, and the FET 3 is turned off and the FET 4 is turned on when triangular wave (broken line) is higher than the output of the error amplifier ERA. Moreover, regarding the step-down comparator PWMD, the FET 1 is turned on and the FET 2 is turned off when triangular wave (solid line) is lower than the output of the error amplifier ERA, and the FET 1 is turned off and the FET 2 is turned on when triangular wave (solid line) is higher than the output of the error amplifier ERA. Here, ON/OFF switching timing for step-down PWM control and ON/OFF switching timing for step-up PWM control are synchronized. Accordingly, ON/OFF switching of the FET 1 and the FET 3 and ON/OFF switching of the FET 2 and the FET 4 are executed simultaneously. It should be noted that the operations are the same as conventional ones (FIG. 4 and FIG. 5) when only step-down PWM control is executed or when only step-up PWM control is executed.

Figure 11:
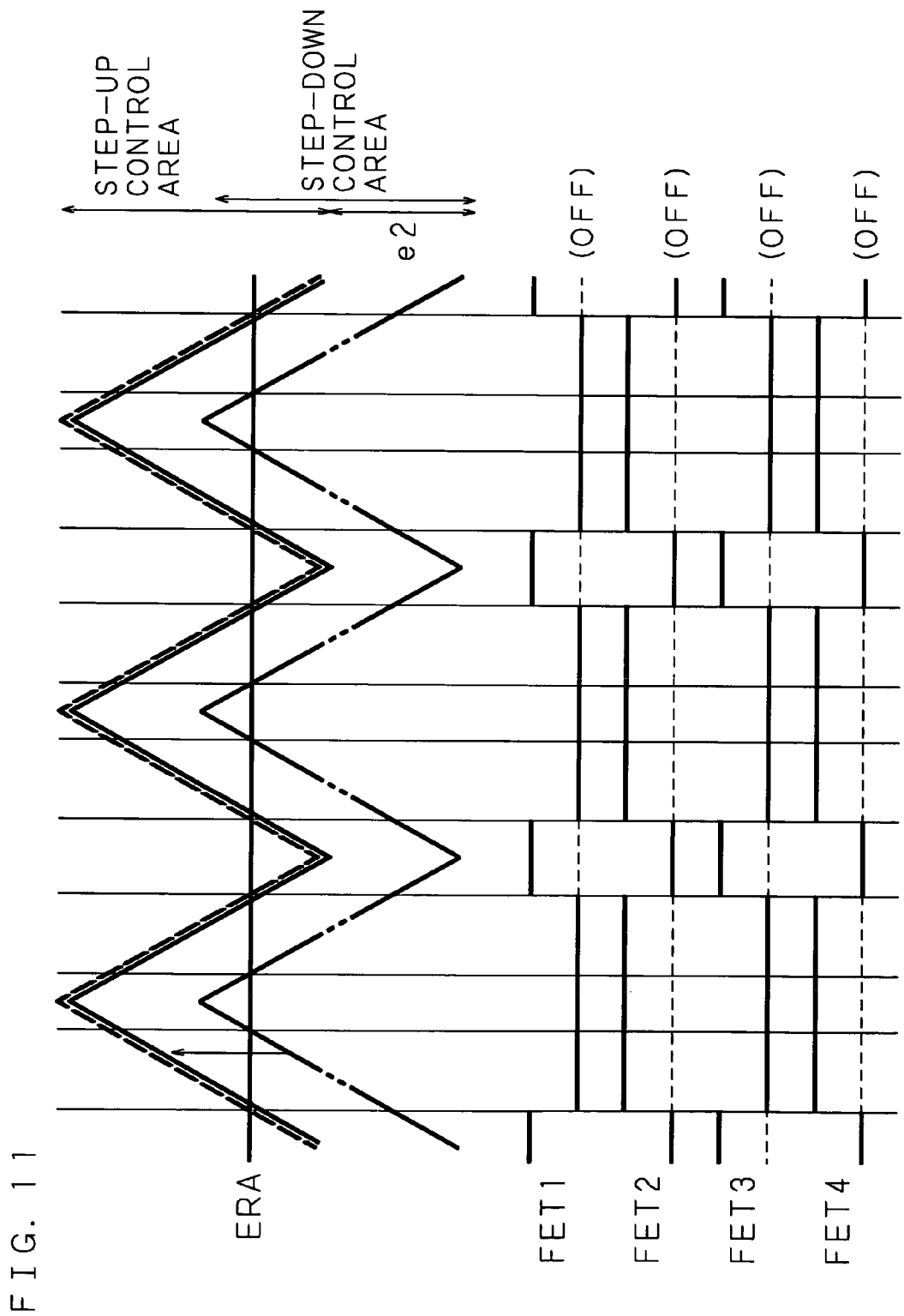
FIG. 11 is a timing chart schematically showing another example of the operational state of a case where both of step-up PWM control and step-down PWM control are executed.
Figure 12:
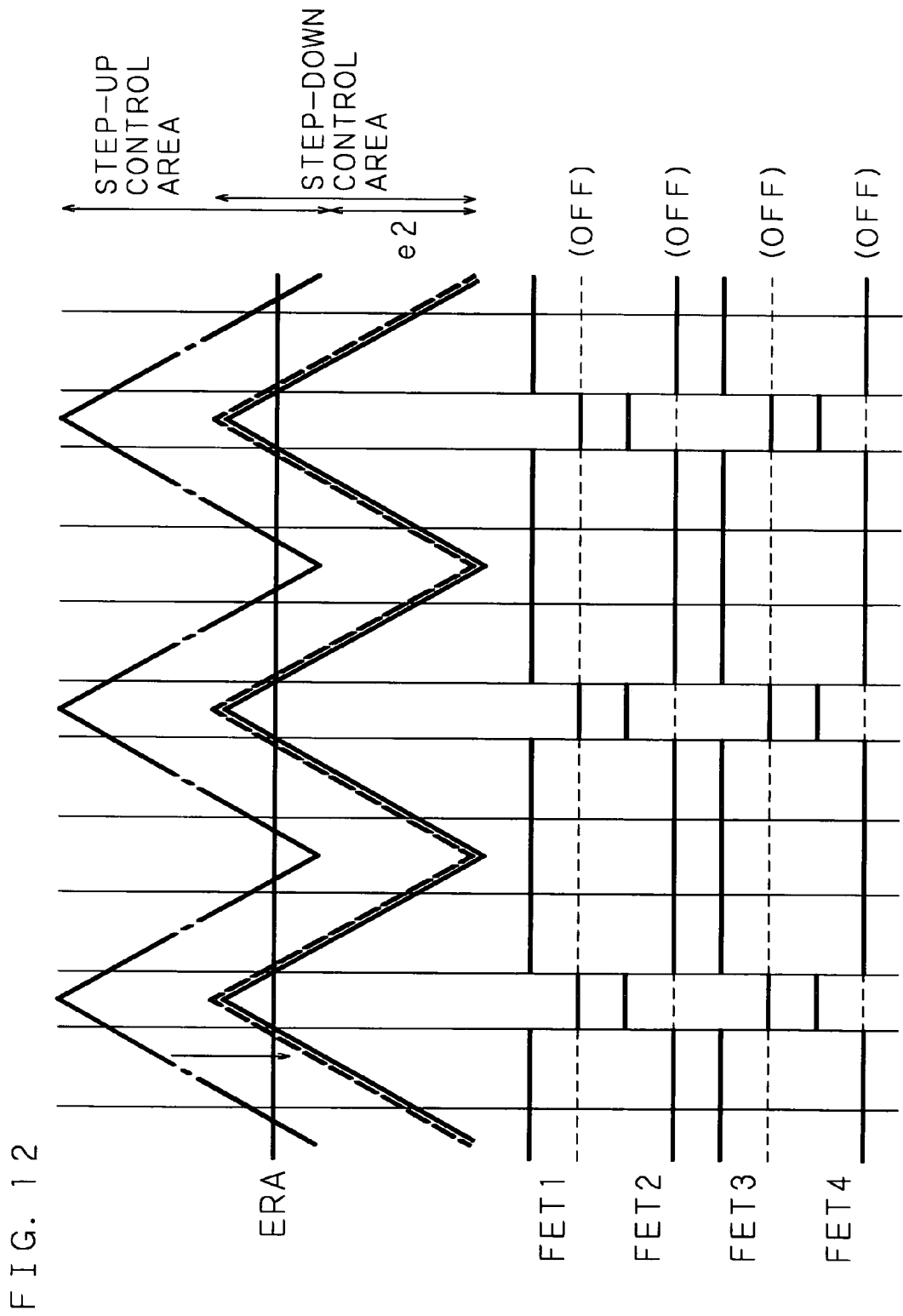
FIG. 12 is a timing chart schematically showing another example of the operational state of a case where both of step-up PWM control and step-down PWM control are executed.

Though the embodiment mentioned above is configured to change both of offset of ON/OFF switching timing for step-down PWM control and step-up PWM control by lowering offset of triangular wave (long dashed short dashed line) inputted into the step-up comparator PWMU and heightening offset of triangular wave (long dashed double-short dashed line) inputted into the step-down comparator PWMD, it should be understood that only one may be changed. FIG. 11 and FIG. 12 are timing charts schematically showing other examples of the operational state of a case where both of step-up PWM control and step-down PWM control are executed. In FIG. 11, offset is made identical by heightening (heightening by e2, for example) offset of triangular wave (long dashed double-short dashed line) inputted into the step-down comparator PWMD to change only offset of ON/OFF switching timing for step-down PWM control. Moreover, in FIG. 12, offset is made identical by lowering (lowering by e2, for example) offset of triangular wave (long dashed short dashed line) inputted into the step-up comparator PWMU to change only offset of ON/OFF switching timing for step-up PWM control.

When only one of offset of triangular wave (long dashed short dashed line) inputted into the step-up comparator PWMU and offset of triangular wave (long dashed double-short dashed line) inputted into the step-down comparator PWMD is to be changed, the offset change unit 14 is connected with only one of the step-up comparator PWMU and the step-down comparator PWMD so as to change only the offset of one comparator connected with itself. In this case, the other of the step-up comparator PWMU and the step-down comparator PWMD which is not connected does not require the offset generating circuit 42.

Figure 13:
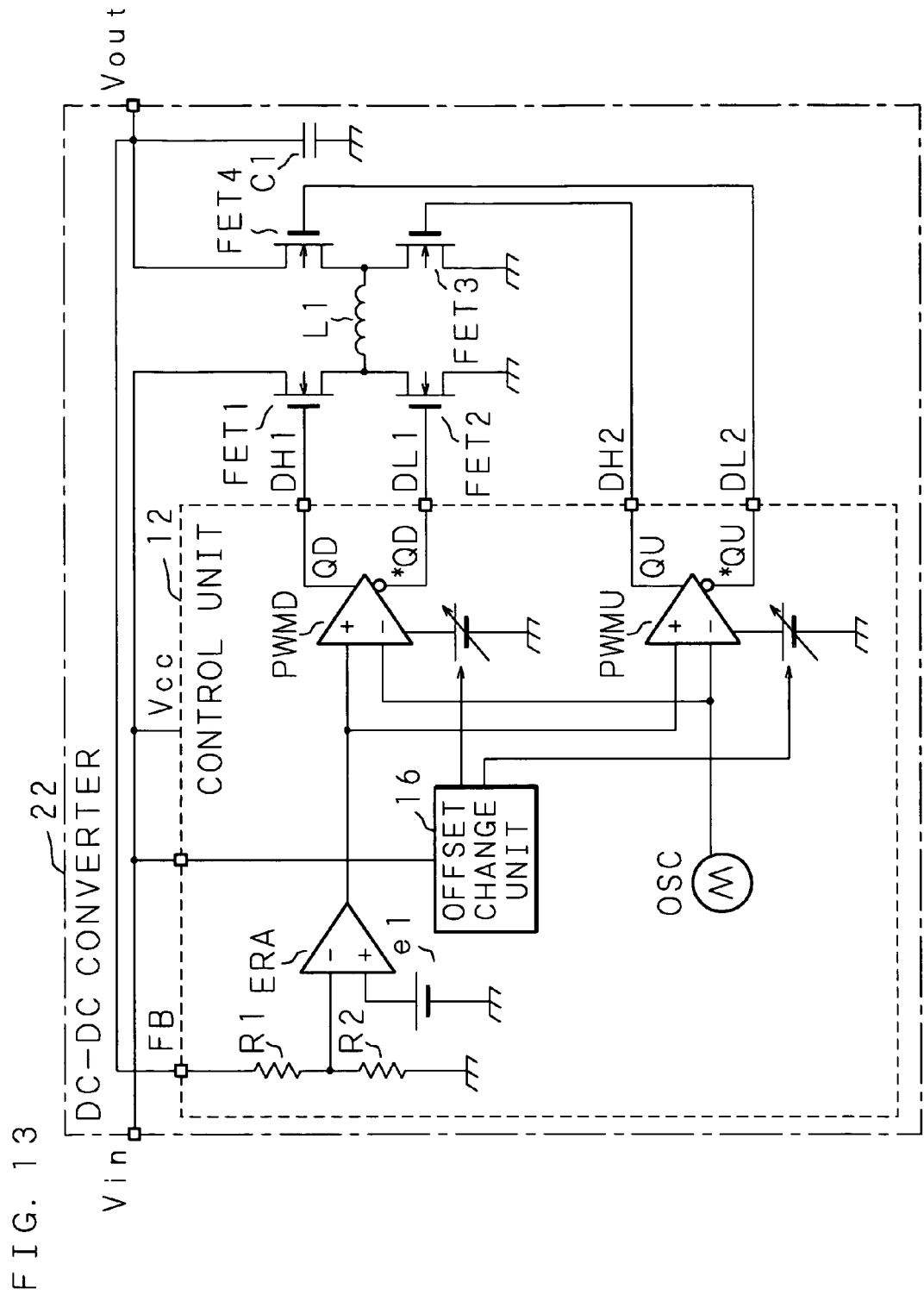
FIG. 13 is a schematic circuit diagram showing another example of a DC-DC converter which uses a DC-DC converter control apparatus according to the present invention.

Moreover, though the embodiment mentioned above is configured to judge with the offset change unit 14 whether both of step-down PWM control and step-up PWM control are executed or not on the basis of the output voltage of the error amplifier ERA, judgment can be made on the basis of inputted voltage Vin. FIG. 13 is a schematic circuit diagram showing another example of a DC-DC converter which uses a DC-DC converter control apparatus (control unit) according to the present invention.

The configuration of the DC-DC converter 22 shown in FIG. 13 is substantially the same as that shown in FIG. 7, except that the offset change unit 16 of the control unit 12 is connected with the input voltage terminal Vin instead of the output terminal of the error amplifier ERA. For example, the offset change unit 16 can judge that both of step-down PWM control and step-up PWM control are executed when an equation $\Delta V1 \leq Vin \leq \Delta V2$ (here, $\Delta V1$ is a threshold voltage for step-up operation switching and $\Delta V2$ is a threshold voltage for step-down operation switching) is provided, judge that step-up PWM control is executed when an equation Vin<ΔV1 is provided and judge that step-down PWM control is executed when an equation ΔV2<Vin is provided.

Moreover, the DC-DC converter 22 or the control unit (DC-DC converter control apparatus) mentioned above can be configured by a one-chip semiconductor or configured on printed board. Moreover, the DC-DC converter or the DC-DC converter control apparatus of the present invention can be used for any power supply apparatus for converting and supplying voltage outputted from battery of the like. Moreover, the DC-DC converter or the DC-DC converter control apparatus of the present invention can be used for any electronic equipment for converting and using voltage outputted from battery or the like.

It should be noted that, though gate voltage of a drive circuit has to be generated by a charging pump or the like when n-type field-effect transistors FETs are used as a main switch on step-down side (FET 1) and as a rectification switch on step-up side (FET 4), that is a known technique and is not illustrated in the schematic circuit diagrams in FIG. 7, FIG. 13, FIG. 14, FIG. 15 and FIG. 16.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A DC-DC converter control apparatus for controlling a DC-DC converter to convert an input voltage into a predetermined output voltage by making said DC-DC converter execute at least one of a plurality of kinds of PWM controls, comprising:
    a differential output circuit for generating a signal corresponding to a difference between an output voltage and a predetermined voltage;
    an offset change circuit for receiving the signal generated from the differential output circuit, and for changing offset of ON/OFF switching timing for PWM control on the basis of a kind of said plurality of PWM controls under execution by said DC-DC converter;
    an oscillator for generating a triangular wave signal;
    a step-up comparator circuit for comparing signals generated from said oscillator and said differential output circuit and generating a step-up PWM control signal corresponding to a comparison result; and
    a step-down comparator circuit for comparing signals generated from said oscillator and said differential output circuit and generating a step-down PWM control signal corresponding to a comparison result,
    wherein said plurality of kinds of PWM controls includes step-up PWM control, step-down PWM control, and both of step-up PWM control and step-down PWM control, and
    wherein said offset change circuit changes offset of the triangular wave signal generated from said oscillator so as to change offset of ON/OFF switching timing for step-up PWM control and/or offset of ON/OFF switching timing for step-down PWM control on the basis of a kind of PWM control under execution by said DC-DC converter.

2. A DC-DC converter control apparatus for controlling a DC-DC converter to convert an input voltage into a predetermined output voltage by making said DC-DC converter execute at least one of a plurality of kinds of PWM controls, comprising:
    an offset change circuit for changing offset of ON/OFF switching timing for PWM control on the basis of a kind of said plurality of PWM controls under execution by said DC-DC converter;
    a differential output circuit for generating a signal corresponding to a difference between an output voltage and a predetermined voltage;
    an oscillator for generating a triangular wave signal;
    a step-up comparator circuit for comparing signals generated from said oscillator and said differential output circuit and generating a step-up PWM control signal corresponding to a comparison result; and
    a step-down comparator circuit for comparing signals generated from said oscillator and said differential output circuit and generating a step-down PWM control signal corresponding to a comparison result,
    wherein said plurality of kinds of PWM controls includes step-up PWM control, step-down PWM control, and both of step-up PWM control and step-down PWM control,
    wherein said offset change circuit changes offset of the triangular wave signal generated from said oscillator so as to change offset of ON/OFF switching timing for step-up PWM control and/or offset of ON/OFF switching timing for step-down PWM control on the basis of a kind of PWM control under execution by said DC-DC converter, and
    wherein said offset change circuit, when kinds of PWM control under execution by said DC-DC converter are both of step-up PWM control and step-down PWM control, changes offset of ON/OFF switching timing for step-up PWM control and/or offset of ON/OFF switching timing for step-down PWM control by changing offset of the triangular wave signal generated from said oscillator so that the offset of ON/OFF switching timing for step-up PWM control and the offset of ON/OFF switching timing for step-down PWM control become identical.

3. A power supply apparatus including a DC-DC converter control apparatus for controlling a DC-DC converter to convert an input voltage into a predetermined output voltage by making said DC-DC converter execute at least one of a plurality of kinds of PWM control, wherein
    said DC-DC converter control apparatus comprises:
    a differential output circuit for generating a signal corresponding to a difference between an output voltage and a predetermined voltage;
    an offset change circuit for receiving the signal generated from the differential output circuit, and for changing offset of ON/OFF switching timing for PWM control on the basis of a kind of said plurality of PWM controls under execution by said DC-DC converter;
    an oscillator for generating a triangular wave signal;
    a step-up comparator circuit for comparing signals generated from said oscillator and said differential output circuit and generating a step-up PWM control signal corresponding to a comparison result; and
    a step-down comparator circuit for comparing signals generated from said oscillator and said differential output circuit and generating a step-down PWM control signal corresponding to a comparison result, wherein said plurality of kinds of PWM control includes step-up PWM control, step-down PWM control, and both of step-up PWM control and step-down PWM control, wherein said offset change circuit changes offset of the triangular wave signal generated from said oscillator so as to change offset of ON/OFF switching timing for step-up PWM control and/or offset of ON/OFF switching timing for step-down PWM control on the basis of a kind of PWM control under execution by said DC-DC converter, and wherein said DC-DC converter control apparatus controls said DC-DC converter to convert voltage.

4. A power supply apparatus including a DC-DC converter control apparatus for controlling a DC-DC converter to convert an input voltage into a predetermined output voltage by making said DC-DC converter execute at least one of a plurality of kinds of PWM control, wherein said DC-DC converter control apparatus comprises:

an offset change circuit for changing offset of ON/OFF switching timing for PWM control on the basis of a kind of said plurality of PWM controls under execution by said DC-DC converter;

a differential output circuit for generating a signal corresponding to a difference between an output voltage and a predetermined voltage;

an oscillator for generating a triangular wave signal;

a step-up comparator circuit for comparing signals generated from said oscillator and said differential output circuit and generating a step-up PWM control signal corresponding to a comparison result; and a step-down comparator circuit for comparing signals generated from said oscillator and said differential output circuit and generating a step-down PWM control signal corresponding to a comparison result, wherein said plurality of kinds of PWM control includes step-up PWM control, step-down PWM control, and both of step-up PWM control and step-down PWM control, wherein said offset change circuit changes offset of the triangular wave signal generated from said oscillator so as to change offset of ON/OFF switching timing for step-up PWM control and/or offset of ON/OFF switching timing for step-down PWM control on the basis of a kind of PWM control under execution by said DC-DC converter, wherein said DC-DC converter control apparatus controls said DC-DC converter to convert voltage, and wherein said offset change circuit, when kinds of PWM control under execution by said DC-DC converter are both of step-up PWM control and step-down PWM control, changes offset of ON/OFF switching timing for step-up PWM control and/or offset of ON/OFF switching timing for step-down PWM control by changing offset of the triangular wave signal generated from said oscillator so that the offset of ON/OFF switching timing for step-up PWM control and the offset of ON/OFF switching timing for step-down PWM control become identical.

5. An electronic equipment including a DC-DC converter control apparatus for controlling a DC-DC converter to convert an input voltage into a predetermined output voltage by making said DC-DC converter execute at least one of a plurality of kinds of PWM controls, wherein said DC-DC converter control apparatus comprises:

a differential output circuit for generating a signal corresponding to a difference between an output voltage and a predetermined voltage;

an offset change circuit for receiving the signal generated from the differential output circuit, and for changing offset of ON/OFF switching timing for PWM control on the basis of a kind of said plurality of PWM controls under execution by said DC-DC converter; converter execute at least one of a plurality of kinds of PWM controls, wherein said DC-DC converter control apparatus comprises:

an offset change circuit for changing offset of ON/OFF switching timing for PWM control on the basis of a kind of said plurality of PWM controls under execution by said DC-DC converter;

a differential output circuit for generating a signal corresponding to a difference between an output voltage and a predetermined voltage;

an oscillator for generating a triangular wave signal;

a step-up comparator circuit for comparing signals generated from said oscillator and said differential output circuit and generating a step-up PWM control signal corresponding to a comparison result; and a step-down comparator circuit for comparing signals generated from said oscillator and said differential output circuit and generating a step-down PWM control signal corresponding to a comparison result, wherein said plurality of kinds of PWM control includes step-up PWM control, step-down PWM control, and both of step-up PWM control and step-down PWM control, wherein said offset change circuit changes offset of the triangular wave signal generated from said oscillator so as to change offset of ON/OFF switching timing for step-up PWM control and/or offset of ON/OFF switching timing for step-down PWM control on the basis of a kind of PWM control under execution by said DC-DC converter, wherein said DC-DC converter control apparatus controls said DC-DC converter to convert voltage, and an oscillator for generating a triangular wave signal;

a step-up comparator circuit for comparing signals generated from said oscillator and said differential output circuit and generating a step-up PWM control signal corresponding to a comparison result; and a step-down comparator circuit for comparing signals generated from said oscillator and said differential output circuit and generating a step-down PWM control signal corresponding to a comparison result, wherein said plurality of kinds of PWM control includes step-up PWM control, step-down PWM control, and both of step-up PWM control and step-down PWM control, wherein said offset change circuit changes offset of the triangular wave signal generated from said oscillator so as to change offset of ON/OFF switching timing for step-up PWM control and/or offset of ON/OFF switching timing for step-down PWM control on the basis of a kind of PWM control under execution by said DC-DC converter, and wherein said DC-DC converter control apparatus controls said DC-DC converter to convert voltage.

6. An electronic equipment including a DC-DC converter control apparatus for controlling a DC-DC converter to convert an input voltage into a predetermined output voltage by making said DC-DC wherein said offset change circuit, when kinds of PWM control under execution by said DC-DC converter are both of step-up PWM control and step-down PWM control, changes offset of ON/OFF switching timing for step-up PWM control and/or offset of ON/OFF switching timing for step-down PWM control by changing offset of the triangular wave signal generated from said oscillator so that the offset of ON/OFF switching timing for step-up PWM control and the offset of ON/OFF switching timing for step-down PWM control become identical.

7. A control method for DC-DC converter for controlling, by control apparatus, a DC-DC converter to convert an input voltage into a predetermined output voltage by making said DC-DC converter execute at least one of a plurality of kinds of PWM control, wherein said control apparatus comprises:

a differential output circuit for generating a signal corresponding to a difference between an output voltage and a predetermined voltage;

an offset change circuit for receiving the signal generated from the differential output circuit, and for changing offset of ON/OFF switching timing for PWM control on the basis of a kind of said plurality of PWM controls under execution by said DC-DC converter;

an oscillator for generating a triangular wave signal;

a step-up comparator circuit for comparing signals generated from said oscillator and said differential output circuit and generating a step-up PWM control signal corresponding to a comparison result; and a step-down comparator circuit for comparing signals generated from said oscillator and said differential output circuit and generating a step-down PWM control signal corresponding to a comparison result;

said method comprising steps of:

identifying a kind of PWM control under execution by said DC-DC converter; and by said control apparatus, when kinds of PWM control under execution by said DC-DC converter are both of step-up PWM control and step-down PWM control, changing offset of ON/OFF switching timing for step-up PWM control and/or offset of ON/OFF switching timing for step-down PWM control by changing offset of the triangular wave signal generated from said oscillator so that the offset of ON/OFF switching timing for step-up PWM control and the offset of ON/OFF switching timing for step-down PWM control become identical.

* * * * *